United States Patent
An et al.

(10) Patent No.: US 12,461,090 B2
(45) Date of Patent: Nov. 4, 2025

(54) DIMETHYLARSINOUS ACID-INDUCED MALIGNANTLY TRANSFORMED CELL LINE OF HUMAN KERATINOCYTES AND USE THEREOF

(71) Applicant: SOOCHOW UNIVERSITY, Suzhou (CN)

(72) Inventors: Yan An, Suzhou (CN); Rui Yan, Suzhou (CN); Jiayuan Mao, Suzhou (CN); Qianlei Yang, Suzhou (CN); Haixuan Xia, Suzhou (CN); Qi Kong, Suzhou (CN); Yuanjie Wei, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 764 days.

(21) Appl. No.: 17/625,740

(22) PCT Filed: Apr. 20, 2021

(86) PCT No.: PCT/CN2021/088303
§ 371 (c)(1),
(2) Date: Jan. 8, 2022

(87) PCT Pub. No.: WO2022/193398
PCT Pub. Date: Sep. 22, 2022

(65) Prior Publication Data
US 2023/0314407 A1    Oct. 5, 2023

(30) Foreign Application Priority Data
Mar. 19, 2021   (CN) .......................... 202110305323.1

(51) Int. Cl.
G01N 33/50   (2006.01)
C12N 5/071   (2010.01)
C12N 5/09    (2010.01)

(52) U.S. Cl.
CPC ....... G01N 33/5011 (2013.01); C12N 5/0629 (2013.01); C12N 5/0693 (2013.01); G01N 33/5044 (2013.01); C12N 2501/999 (2013.01); G01N 2500/10 (2013.01)

(58) Field of Classification Search
CPC .......... G01N 33/5011; G01N 33/5044; G01N 2500/10; C12N 5/0629; C12N 5/0693; C12N 2501/999
See application file for complete search history.

(56) References Cited

FOREIGN PATENT DOCUMENTS

| CN | 1337400 A | 2/2002 |
|---|---|---|
| CN | 101501181 A | 8/2009 |
| CN | 108251381 A | 7/2018 |

OTHER PUBLICATIONS

Mao et al.,Possible differences in the mechanism of malignant transformation of HaCaT cells by arsenite and its dimethyl metabolites, particularly dimethylthioarsenics, 2020, Journal of Trace Elements in Medicine and Biology, 61, pp. 1-8 (Year: 2020).*

Wang et al., Hypermethylation oft hekeap1 gene inactivates its function, promotes Nrf2 nuclear accumulation, and is involved in arsenite-induced human keratinocyte transformation(2015, Free Radical Biology and Medicine, 209-219 (Year: 2019).*

Liarte et al. Human Skin Keratinocytes on Sustained TGF-Stimulation Reveal Partial EMT Features and Weaken Growth Arrest Responses, 2020, Cells, 9, pp. 1-20 (Year: 2020).*

Sun et al., Overabundance of Putative Cancer Stem Cells in Human Skin Keratinocyte Cells Malignantly Transformed by Arsenic, 2012, Toxicological Sciences, 125(1): 20-29 (Year: 2012).*

Mao et al., Possible dilerences in the mechanism of malignant transformation of HaCaT cells by arsenite and its dimethyl metabolites, particularly dimethylthioarsenics, Journal of Trace Elements in Medicine and Biology 61 (2020) 126544 (Dec. 31, 2020).

Wang et al., Hypermethylation of the Keap1 gene inactivates its function, promotes Nrf2 nuclear accumulation, and is involved in arsenite-induced human keratinocyte transformation, Free Radical Biology and Medicine 89 (2015) 209-219 (Dec. 31, 2015).

* cited by examiner

Primary Examiner — Allison M Fox
Assistant Examiner — Hanan Isam Abuzeineh
(74) Attorney, Agent, or Firm — SZDC Law PC

(57) ABSTRACT

The present invention relates to the technical field of model establishment, and provides a dimethylarsinous acid-induced malignantly transformed cell line of human keratinocytes and application thereof. In the present invention, human keratinocytes are persistently exposed to and incubated with a low dose of dimethylarsinous acid, to construct an inorganic arsenic metabolite dimethylarsinous acid ($DMA^{III}$)-induced malignantly transformed cell model of human keratinocytes. The malignantly transformed cell model of the present invention promotes the identification of carcinogenicity of arsenic methylated metabolites, and indicates that long-term exposure to low-dose arsenic metabolite dimethylarsinous acid ($DMA^{III}$) causes malignant transformation of skin cells, thus providing a new cell model basis and new research idea for the study of carcinogenic mechanism of arsenic.

7 Claims, 4 Drawing Sheets

DIMETHYLARSINOUS ACID-INDUCED MALIGNANTLY TRANSFORMED CELL LINE OF HUMAN KERATINOCYTES AND USE THEREOF

This application is the National Stage Application of PCT/CN2021/088303, filed on Apr. 20, 2021, which claims priority to Chinese Patent Application No. 202110305323.1, filed on Mar. 19, 2021, which is incorporated by reference for all purposes as if fully set forth herein.

FIELD OF THE INVENTION

The present invention relates to the technical field of model establishment, and more particularly to a dimethylarsinous acid-induced malignantly transformed cell line of human keratinocytes and use thereof.

DESCRIPTION OF THE RELATED ART

Inorganic arsenic and its compounds are confirmed carcinogens for humans. Previously, it is often considered that the metabolism of inorganic arsenic in the body is a process of detoxification. However, recent studies have found that it produces highly toxic product dimethylarsinous acid (DMA') during the metabolic process, which may be closely related to the occurrence of cancer. Due to the lack of relevant animal models, the specific molecular mechanism of carcinogenesis is still unclear, resulting in a lack of clinically effective early diagnosis and treatment methods.

At present, the research on the carcinogenic mechanism of arsenic mainly involves the use of an in-vitro malignantly transformed cell model established by chronic exposure to inorganic arsenic, and the malignantly transformed cell model can be better used to study the carcinogenic mechanism of carcinogens. However, the in-vitro malignantly transformed cell model established by chronic exposure to inorganic arsenic has its limitations, in which the metabolic transformation of arsenic and the high toxicity of metabolites in the body are not fully considered. In addition, because the genome of human cells is relatively stable and has an effective DNA repair mechanism, it has potent resistance to external damage, and is especially less sensitive to damages caused by carcinogens than some animal cells, and is more difficult to transform compared to animal cells. There is no report on the malignantly transformed cell model induced by dimethylarsinous acid.

SUMMARY OF THE INVENTION

To solve the above problems, a dimethylarsinous acid-induced malignantly transformed cell line of human keratinocytes is constructed in the present invention, which promotes the identification of carcinogenicity of arsenic methylated metabolites, and provides a new idea and model basis for the study of carcinogenic mechanism of arsenic.

A first object of the present invention is to provide a dimethylarsinous acid-induced malignantly transformed cell line of human keratinocytes, which is deposited in China General Microbiological Culture Collection Center (CGMCC, Address: Building #3, NO. 1 Beichen West Road, Chaoyang District, Beijing) under CGMCC Accession No. 21499 on Feb. 4, 2021.

A second object of the present invention is to provide a method for constructing a dimethylarsinous acid-induced malignantly transformed cell line of human keratinocytes. The method comprises specifically persistently exposing and incubating human keratinocytes in a medium containing 0.05-0.15 µM dimethylarsinous acid, refreshing the medium every 20-30 h, and sub-culturing and expanding to the 30-40th passages when the cells has a confluency reaching 75-85%, to obtain the dimethylarsinous acid-induced malignantly transformed cell line of human keratinocytes.

Preferably, the dimethylarsinous acid is prepared by a method including: dissolving dimethylarsinous acid and glutathione at a molar ratio of 1:2-4 in water, mixing well by stirring for 10-24 h, freeze drying, then extracting with cold methanol, removing the solvent methanol after extraction, then recrystallizing in methanol/water solution, and removing the solvent, to obtain a dimethylarsinous acid-glutathione complex, which is dissolved in water, to obtain the dimethylarsinous acid.

Preferably, the freeze drying time is 10-15 h.

Preferably, the medium is Dulbecco's modified Eagle's medium (DMEM) with high glucose.

Preferably, the Dulbecco's modified Eagle's medium (DMEM) with high glucose includes 80-120 µg/ml streptomycin, 80-120 U/ml penicillin and 8-12% fetal bovine serum.

Preferably, the method further comprises indicating the malignant transformation of cells by detecting the secretion of MMP-9, the migration ability or the soft agar colony formation ability of the cells.

A third object of the present invention is to provide use of the dimethylarsinous acid-induced malignantly transformed cell line of human keratinocytes as a cell model in the study of carcinogenic mechanism of dimethylarsinous acid.

A fourth object of the present invention is to provide use of the dimethylarsinous acid-induced malignantly transformed cell line of human keratinocytes in screening or evaluating drugs for the treatment of cancers caused by inorganic arsenic.

The present invention has the following beneficial effects.

In the present invention, an inorganic arsenic metabolite dimethylarsinous acid ($DMA^{III}$)-induced malignantly transformed cell model of human keratinocytes is constructed. The malignantly transformed cell model promotes the identification of carcinogenicity of arsenic methylated metabolites, and indicates that long-term exposure to low-dose arsenic metabolite dimethylarsinous acid (DMA') causes malignant transformation of skin cells, thus providing a new cell model basis and new research idea for the study of carcinogenic mechanism of arsenic.

Deposit of Biological Material:

Dimethylarsinous acid-induced malignantly transformed cell line of human keratinocytes, deposited in China General Microbiological Culture Collection Center (CGMCC, Address: Building #3, NO. 1 Beichen West Road, Chaoyang District, Beijing) under CGMCC Accession No. 21499 on Feb. 4, 2021.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Example 1

Synthesis of inorganic arsenic metabolite dimethylarsinous acid ($DMA^{III}$): 2.5 g (about 17.8 mmol) of $DMA^V$ powder (molecular weight 138) and 16.3 g (about 53.4 mmol) of GSH powder (molecular weight 307.33) were weighed (note: when the GSH powder was weighed, the surface layer of GSH powder in the reagent bottle was discarded and the lower layer of powder was taken, because GSH was susceptible to oxidization). The reagents were dissolved in 100 mL of distilled water at a molar ratio of 1:3, and the mixture was stirred overnight with a magnetic stirrer under an argon atmosphere. The next day, the flask was placed in cold methanol and allowed to be cooled, and then freeze dried in a freeze dryer for 12 h. Then 100 ml of cold methanol was added to extract the solid obtained (the extraction process with cold methanol was repeated 3 times), and then the solvent was evaporated in a water bath to obtain a white powder. Finally, the product was recrystallized in methanol/water to obtain a white microcrystal. The white microcrystal was dried, then evaporated to remove methanol, and further dried under reduced pressure for 24 h to obtain a white solid powder. The obtained powder was confirmed by high performance liquid chromatography-inductively coupled plasma mass spectrometry (HPLC-ICP-MS). (Note: The white solid powder finally obtained is $DMA^{III}$-SG, and when $DMA^{III}$-SG is dissolved in water, it will quickly hydrolyze and finally form $DMA^{III}$).

Figure 1:
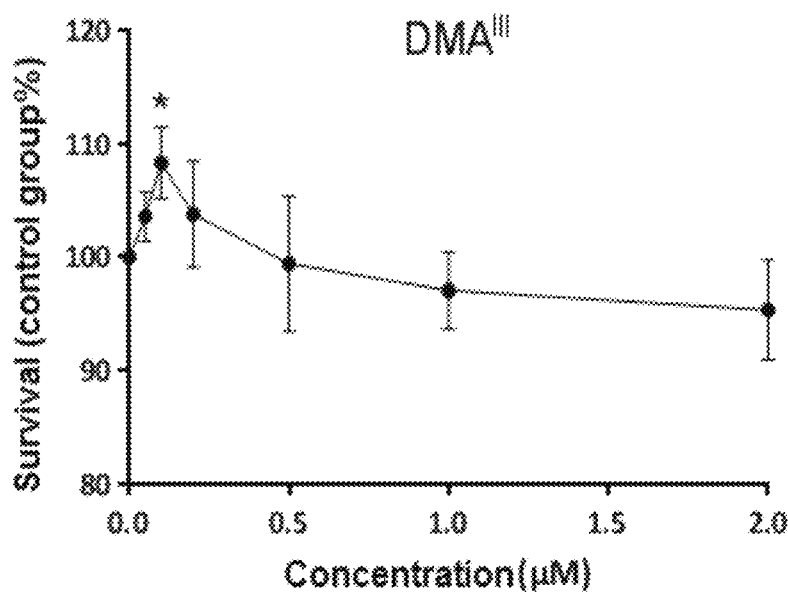
FIG. 1 shows the cell survival of HaCaT cells 24 h after treatment with various concentrations (0-2 µM) of $DMA^{III}$.

Determination of appropriate exposure dose: After the HaCaT cells were treated with various concentrations (0-2 μM) of $DMA^{III}$ for 24 h, and the cell survival was detected by the CCK-8 kit. The dose with the highest cell survival rate was used as the dose for chronic exposure, as shown in FIG. 1. The chronic exposure dose of $DMA^{III}$ is determined to be 0.1 μM.

Example 2

Two dishes of normal HaCaT cells (cell passage 0) were prepared. One dish of cells was persistently and chronically exposed to and incubated with Dulbecco's modified Eagle's medium (DMEM) with high glucose with 0.1 μM $DMA^{III}$ (containing 100 μg/ml streptomycin, 100 U/ml penicillin and 10% fetal bovine serum), and the medium was refreshed every 24 h. When the cells were grown to a confluency reaching 80%, the cells were sub-cultured and expanded up to the 35th passage. The other dish of cells was persistently and chronically exposed to and normally incubated with Dulbecco's modified Eagle's medium (DMEM) with high glucose (containing 100 μg/ml streptomycin, 100 U/ml penicillin and 10% fetal bovine serum), and the medium was refreshed every 24 h. When the cells were grown to a confluency reaching 80%, the cells were normally sub-cultured and expanded up to the 35th passage and used as the passage control group. One monitoring point is set every 7 passages to detect the cell doubling time of the 0th, 1st, 7th, 14th, 21st, 28th, 35th passages in the exposure group and the passage control group.

Example 3

Figure 2:
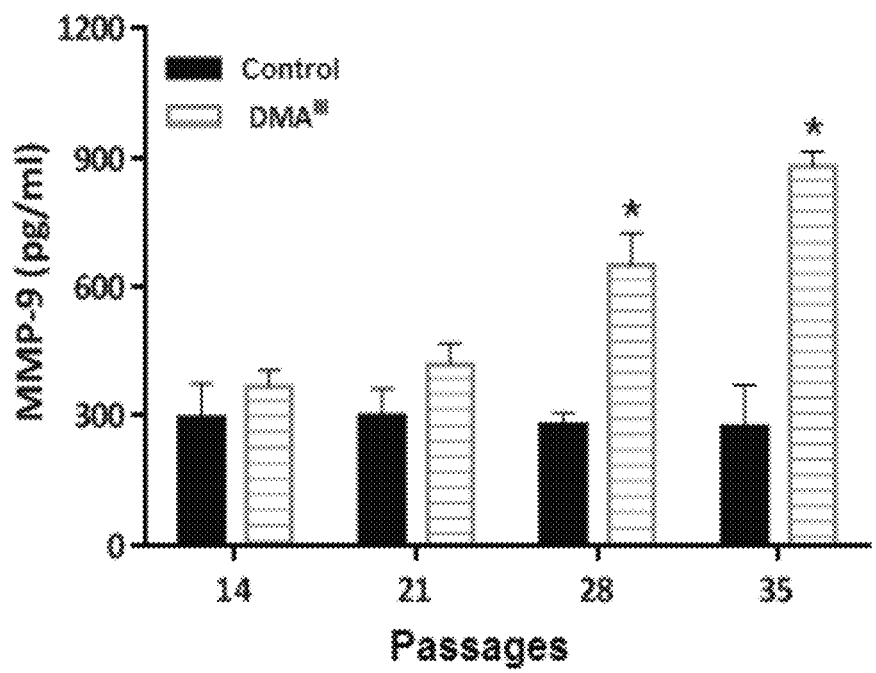
FIG. 2 shows the changes in MMP-9 secretion after persistent exposure of the HaCaT cells sub-cultured to different passages to 0.1 µM $DMA^{III}$. Note: *: compared with the passage control group (without treatment), P<0.05.
Figure 3:
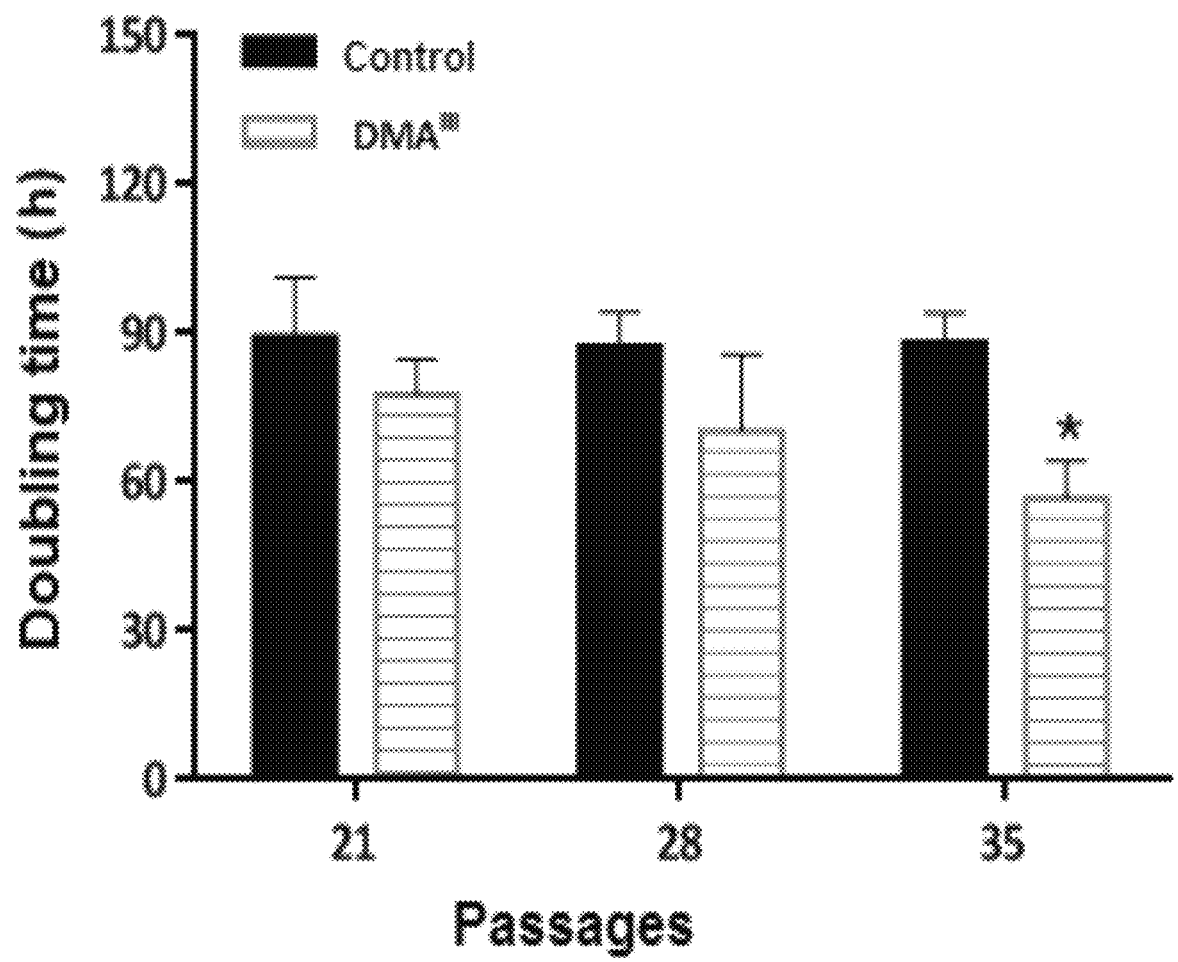
FIG. 3 shows the changes in cell doubling time after persistent exposure of the HaCaT cells sub-cultured to different passages to 0.1 µM $DMA^{III}$. Note: *: compared with the passage control group (without treatment), P<0.05.
Figure 4:
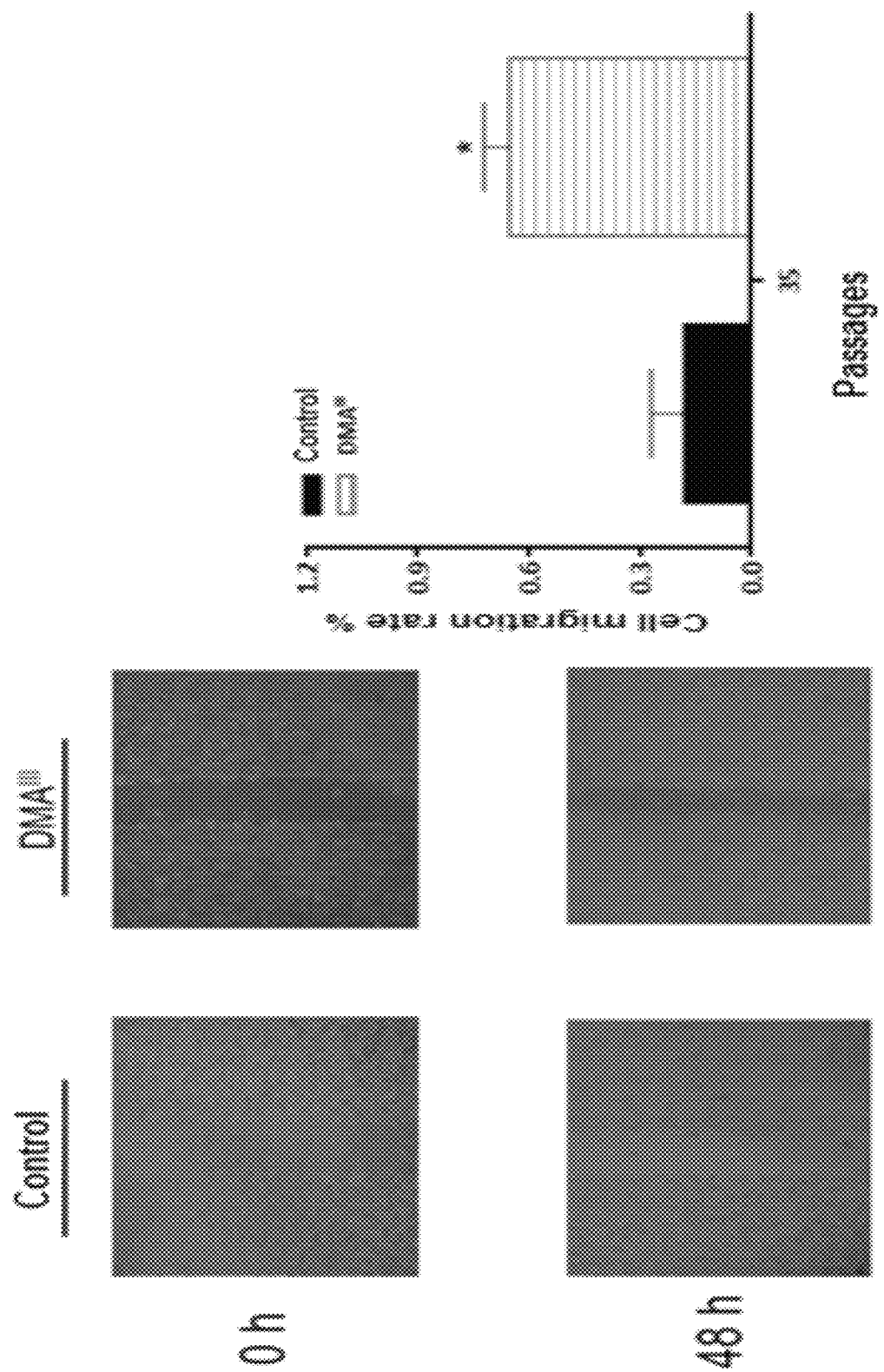
FIG. 4 shows the changes in cell migration ability after persistent exposure of the HaCaT cells sub-cultured to the 35th passage to 0.1 μM $DMA^{III}$. Note: The left panel shows the images of the cell scratch assay of the 35th passage in the exposure group and the passage control group observed under a microscope; and the right panel shows the quantitative analysis of the left panel. Note: *: compared with the passage control group (without treatment), P<0.05.
Figure 5:
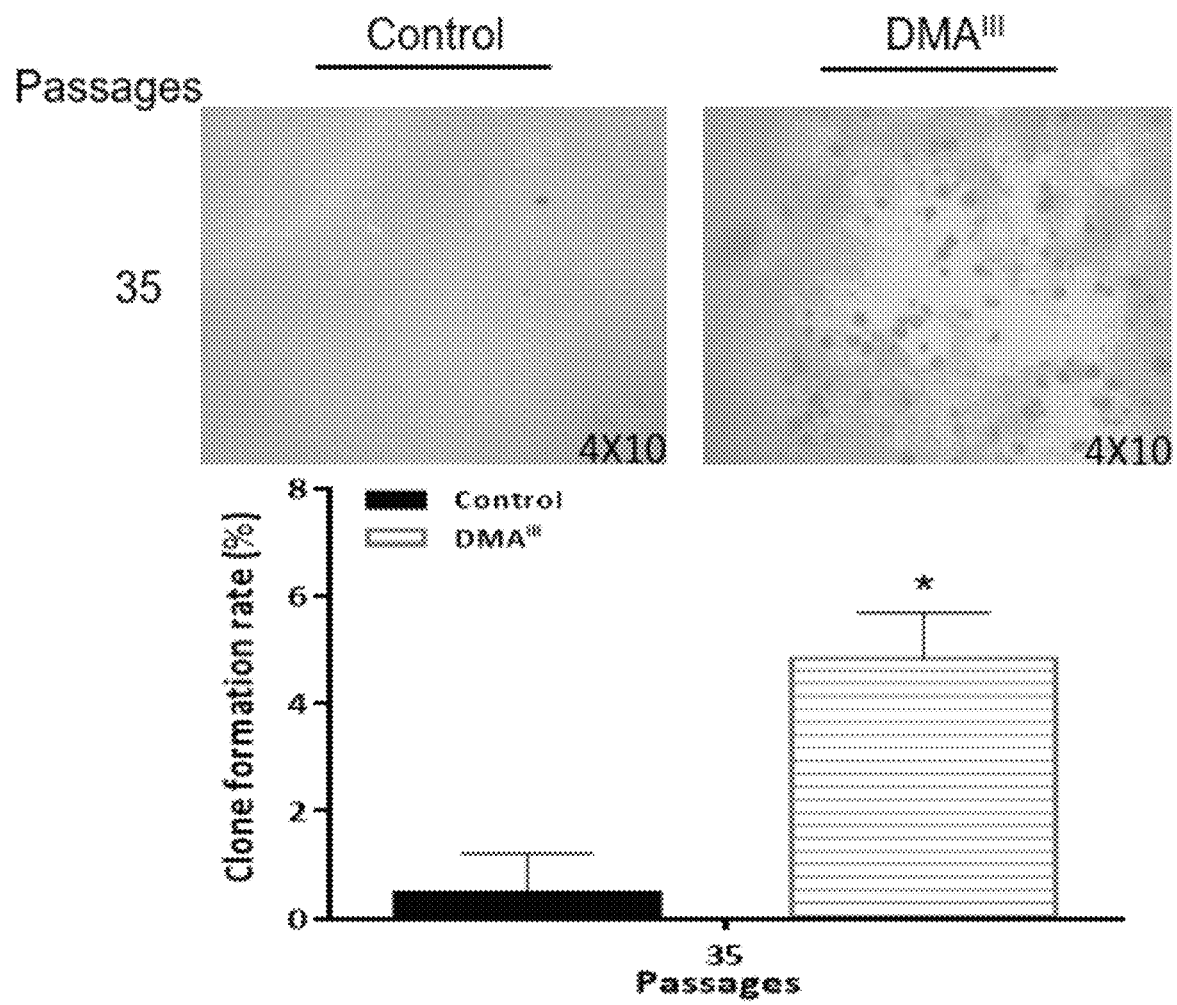
FIG. 5 shows the changes in colony forming ability of cells after persistent exposure of the HaCaT cells sub-cultured to the 35th passage to 0.1 μM $DMA^{III}$. Note: The upper panel shows the images of the soft agar colony forming assay of the 35th passage in the exposure group and the passage control group observed under a microscope, and the lower panel shows the quantitative analysis of the upper panel. Note: *: compared with the passage control group (without treatment), P<0.05.

By detecting the changes in the matrix metalloproteinase-9 (MMP-9), the cell doubling time, the cell migration ability and cell anchoring independent growth, whether the cell undergoes malignant transformation is determined. FIG. 2 reflects the changes in MMP-9 secretion in HaCaT cells of various passages. It can be seen that the secretion of MMP-9 in the 28th and 35th passages incubated by persistently exposing to dimethylarsinous acid is significantly increased compared with the passage control group. FIG. 3 reflects the changes in doubling time of HaCaT cells of various passages. It can be seen that the cell doubling time of the 35th passage incubated by persistently exposing to dimethylarsinous acid is significantly reduced. FIG. 4 shows the changes in cell migration ability of HaCaT cells of the 35th passage detected by scratch test. It can be seen that the cell migration ability of the 35th passage incubated by persistently exposing to dimethylarsinous acid is significantly enhanced. FIG. 5 shows the changes in cell anchoring independent growth detected by soft agar colony forming test of the 35th passage incubated by exposing to dimethylarsinous acid. It can be seen that the cells in the passage control group only form a few tiny colonies in soft agar, and the cells of the 35th passage incubated by persistently exposing to dimethylarsinous acid can form obvious colonies in soft agar, with a colony formation rate significantly higher than that of the passage control group cells. The MMP-9 secretion, the cell doubling time, the cell migration ability and the soft agar colony forming ability mentioned above are all commonly used indicators to identify malignant transformation of cells in vitro. According to the above experimental results, subculture to 35th passage by long-term exposure to 0.1 μM dimethylarsinous acid ($DMA^{III}$) can induce HaCaT cells to undergo malignant transformation. A malignantly transformed cell line of human keratinocytes was obtained, which was deposited in China General Microbiological Culture Collection Center (CGMCC, Address: Building #3, NO. 1 Beichen West Road, Chaoyang District, Beijing) under CGMCC Accession No. 21499 on Feb. 4, 2021.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims.

What is claimed is:

1. A dimethylarsinous acid-induced malignantly transformed cell line of human keratinocytes, which is deposited in China General Microbiological Culture Collection Center (CGMCC, Address: Building #3, NO. 1 Beichen West Road, Chaoyang District, Beijing) under CGMCC Accession No. 21499 on Feb. 4, 2021, wherein the dimethylarsinous acid-induced malignantly transformed cell line of human keratinocytes promotes an identification of carcinogenicity of arsenic methylated metabolites, and is obtained by a long-term exposure to 0.1 µM dimethylarsinous acid and adapted for indicating that a long-term exposure to low-dose arsenic metabolite dimethylarsinous acid causes a malignant transformation of skin cells.

2. A method for constructing a dimethylarsinous acid-induced malignantly transformed cell line of human keratinocytes according to claim 1, comprising persistently exposing and incubating human keratinocytes in a medium containing 0.05-0.15 µM dimethylarsinous acid, refreshing the medium every 20-30 h, and sub-culturing and expanding to the 30-40th passages when the cells has a confluency reaching 75-85%, to obtain the dimethylarsinous acid-induced malignantly transformed cell line of human keratinocytes.

3. The method according to claim 2, wherein the dimethylarsinous acid is prepared by a method comprising: dissolving dimethylarsinous acid and glutathione at a molar ratio of 1:2-4 in water, mixing well by stirring for 10-24 h, freeze drying, then extracting with cold methanol, removing the solvent methanol after extraction, then recrystallizing in methanol/water solution and removing the solvent, to obtain a dimethylarsinous acid-glutathione complex, which is dissolved in water, to obtain the dimethylarsinous acid.

4. The method according to claim 3, wherein the freeze drying time is 10-15 h.

5. The method according to claim 2, wherein the medium is Dulbecco's modified Eagle's medium with high glucose.

6. The method according to claim 5, wherein the Dulbecco's modified Eagle's medium (DMEM) with high glucose comprises 80-120 µg/ml streptomycin, 80-120 U/ml penicillin and 8-12% fetal bovine serum.

7. The method according to claim 2, wherein the method further comprises indicating the malignant transformation of cells by detecting the secretion of MMP-9, the migration ability or the soft agar colony formation ability of the cells.

* * * * *